June 2, 1942.  N. C. L. BROWN  2,285,327
CAR RETARDER FOR RAILROADS
Filed May 6, 1940  6 Sheets-Sheet 1

INVENTOR
N. C. L. Brown,
BY Neil W. Preston
his ATTORNEY

June 2, 1942.  N. C. L. BROWN  2,285,327
CAR RETARDER FOR RAILROADS
Filed May 6, 1940  6 Sheets-Sheet 2
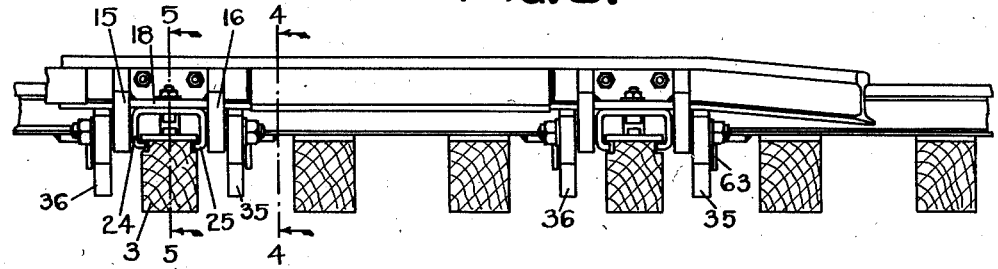
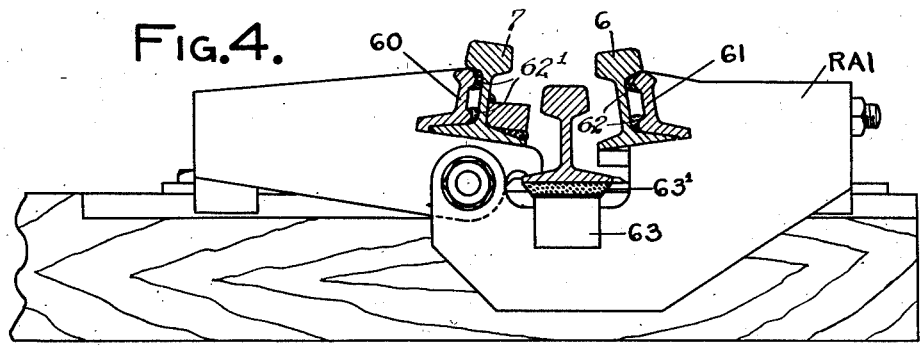
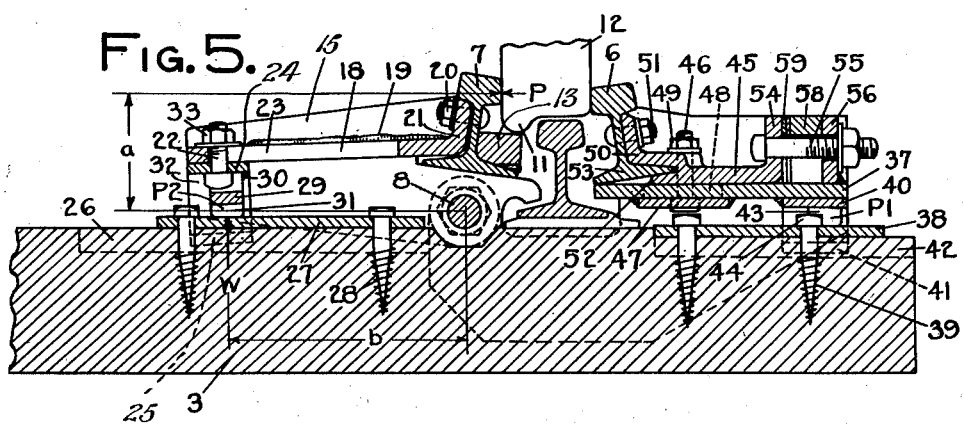
INVENTOR
N. C. L. Brown,
BY Neil W. Preston,
his ATTORNEY June 2, 1942.                N. C. L. BROWN                2,285,327
                          CAR RETARDER FOR RAILROADS
                    Filed May 6, 1940            6 Sheets-Sheet 3
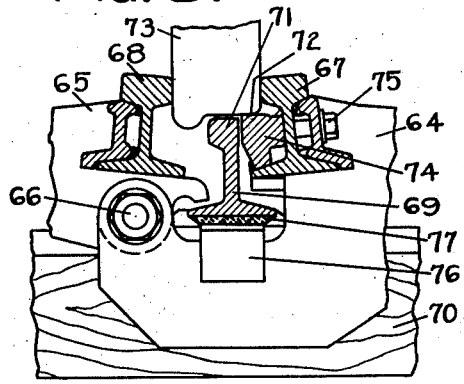
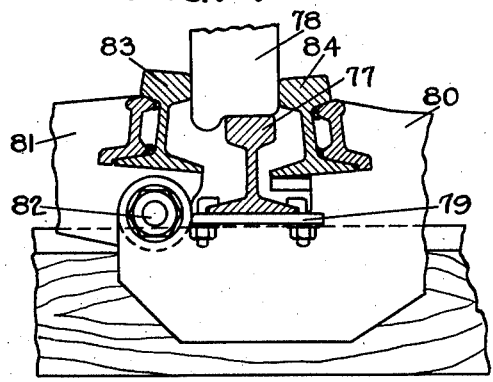
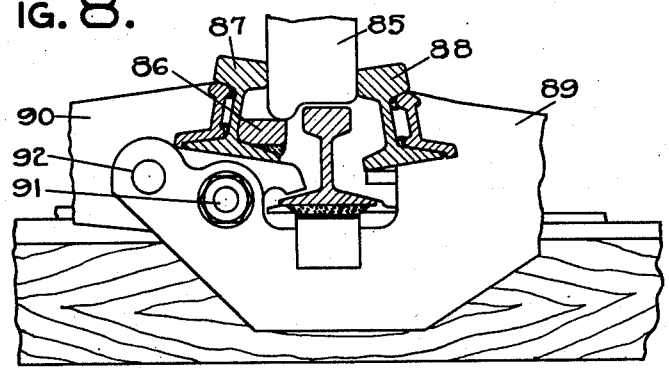
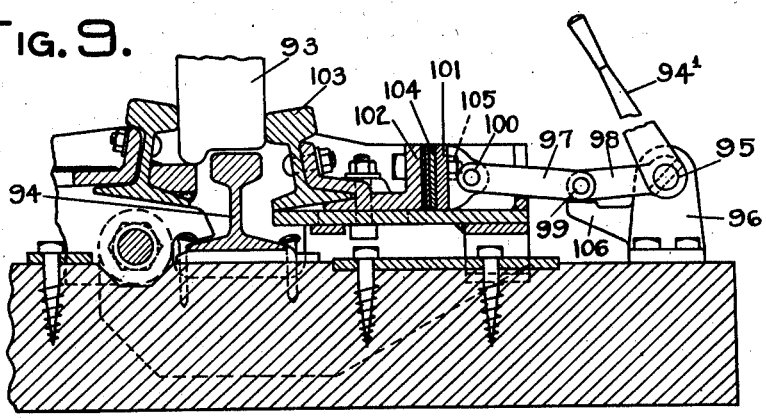
INVENTOR
N. C. L. Brown,
BY Neil L. Preston,
his ATTORNEY

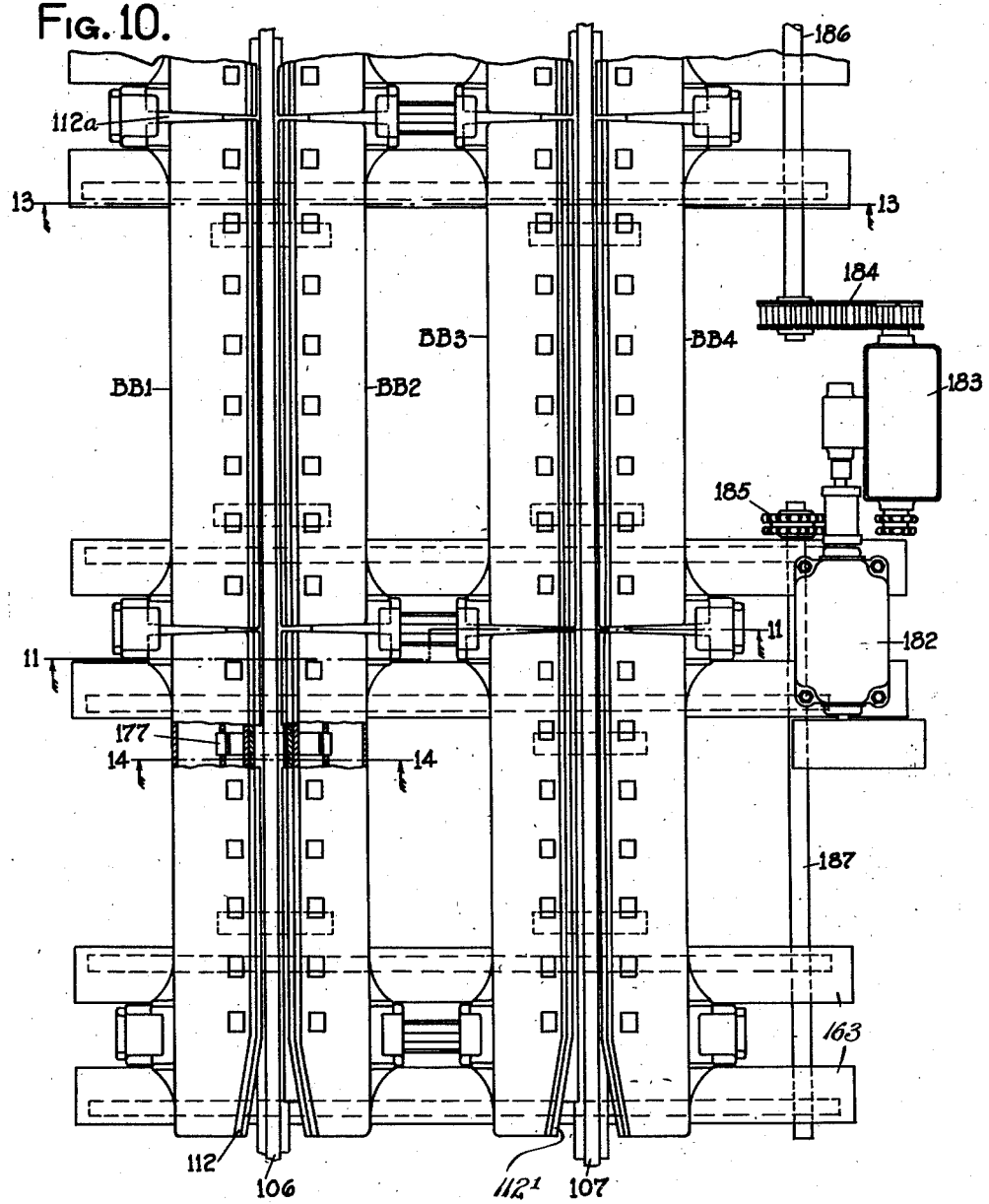

June 2, 1942.   N. C. L. BROWN   2,285,327
CAR RETARDER FOR RAILROADS
Filed May 6, 1940   6 Sheets-Sheet 5

INVENTOR
N. C. L. Brown,
BY Neil W. Preston,
his ATTORNEY

June 2, 1942. N. C. L. BROWN 2,285,327
CAR RETARDER FOR RAILROADS
Filed May 6, 1940 6 Sheets-Sheet 6

INVENTOR
N. C. L. Brown,
BY Neil W. Preston,
his ATTORNEY

Patented June 2, 1942

2,285,327

UNITED STATES PATENT OFFICE 2,285,327

CAR RETARDER FOR RAILROADS

Ned C. L. Brown, Scottsville, N. Y., assignor to General Railway Signal Company, Rochester, N. Y.

Application May 6, 1940, Serial No. 333,589

23 Claims. (Cl. 188—62)

This invention relates in general to car retarders of the track brake type, and has more particular reference to retarders of this type which automatically vary the degree of retardation in accordance with the weight of the car being retarded.

In connection with railway operation, at various terminals there are classification yards which, although they assume various forms, involve, in their simplest form, an entrance track branching out through track switches into a number of classification tracks. These classification tracks in turn converge through track switches into an exit track. A train of cars entering the terminal may have cars destined for many different points, and cars of various classifications of freight, which cars must be sorted out on the various classification tracks before they can leave the terminal in properly classified trains.

One method of accomplishing the classification is to push each car, or cuts of cars, over a hump, at a low speed of perhaps two miles per hour, and then to accelerate them by gravity so that momentum will be attained near the entrance to the diverging tracks, sufficient to carry the hardest rolling car through the classification tracks to the desired point thereon and then to couple up with the other cars on this track. Easier rolling cars may result from variations in rolling resistance, axle resistance, wind resistance, etc., and particularly to weight. These easier rolling cars will acquire an excessive amount of energy, and this energy should be absorbed before entrance to the classification tracks, in order to avoid undue shock and damage upon coupling with other cars on the same track. This energy is absorbed by the car retarder, which is positioned near the entrance to the classification tracks.

The acceleration of the various cars after leaving the hump, under the influence of gravity, will result in all the cars arriving at the retarder at substantially the same speed, for a decrease in wind resistance on the heavier cars may largely be off-set by an increase in the axle resistance, whereby cars of different weight, and having the same speed on entering the retarder, have energy in proportion to their weights. Accordingly, a retarder which is arranged to automatically absorb energy, that is to vary the amount of retardation, automatically, in accordance with weight, will cause the various cars of different weight to leave the retarder at substantially the same speed, and thus avoid any necessity for adjusting the retarder for each car in accordance with the car weight.

With the above and other objects in view, it is proposed, in accordance with this invention, to provide several forms of retarders, each of which automatically retard to an amount in proportion to the weight of the car involved.

The effect of a car in producing retardation on itself, although varying with the weight of the car, varies also in accordance with various ratios of lever involved in the construction of the retarders. Accordingly, it is proposed, in accordance with this invention, to provide pivot points or fulcrums which can be adjusted in position whereby to vary these ratios and thus the degree of effectiveness of any given weight of car in producing retardation.

Other objects of the invention are to provide brake shoes or beams of a character which are efficient in operation and still are very economical and dependable, and this is accomplished by employing old or worn-out track rails as the brake shoes.

A further object of the invention is to provide convenient, efficient, and economical means for varying the positions of the pivot points, to thereby vary the effectiveness of a given weight in producing retardation.

Further objects, purposes and characteristic features of the present invention will appear as the description progresses, reference being made to the accompanying drawings showing, solely for the purpose of illustration, and in no manner whatsoever in a limiting sense, several forms which the invention can assume. In the drawings:

Fig. 3 is a sectional view, on line 3—3 of Fig. 1, and viewed in the direction of the arrows.

Fig. 4 is a sectional view, on the line 4—4 of Fig. 3, and viewed in the direction of the arrows.

Fig. 5 is a sectional view, on the line 5—5 of Fig. 3, and viewed in the direction of the arrows.

Fig. 6 is a fragmentary sectional view of a modified form of the "inert" type of retarder.

Fig. 7 is a fragmentary sectional view of a different modified form of the "inert" type of retarder.

Fig. 8 is a fragmentary sectional view of a different modified form of the "inert" type of retarder.

Fig. 9 is a fragmentary sectional view of a different modified form of the "inert" type of retarder.

Fig. 10 is a fragmentary plan view of another form of retarder, known as the "operated weight automatic" type.

Figure 1:
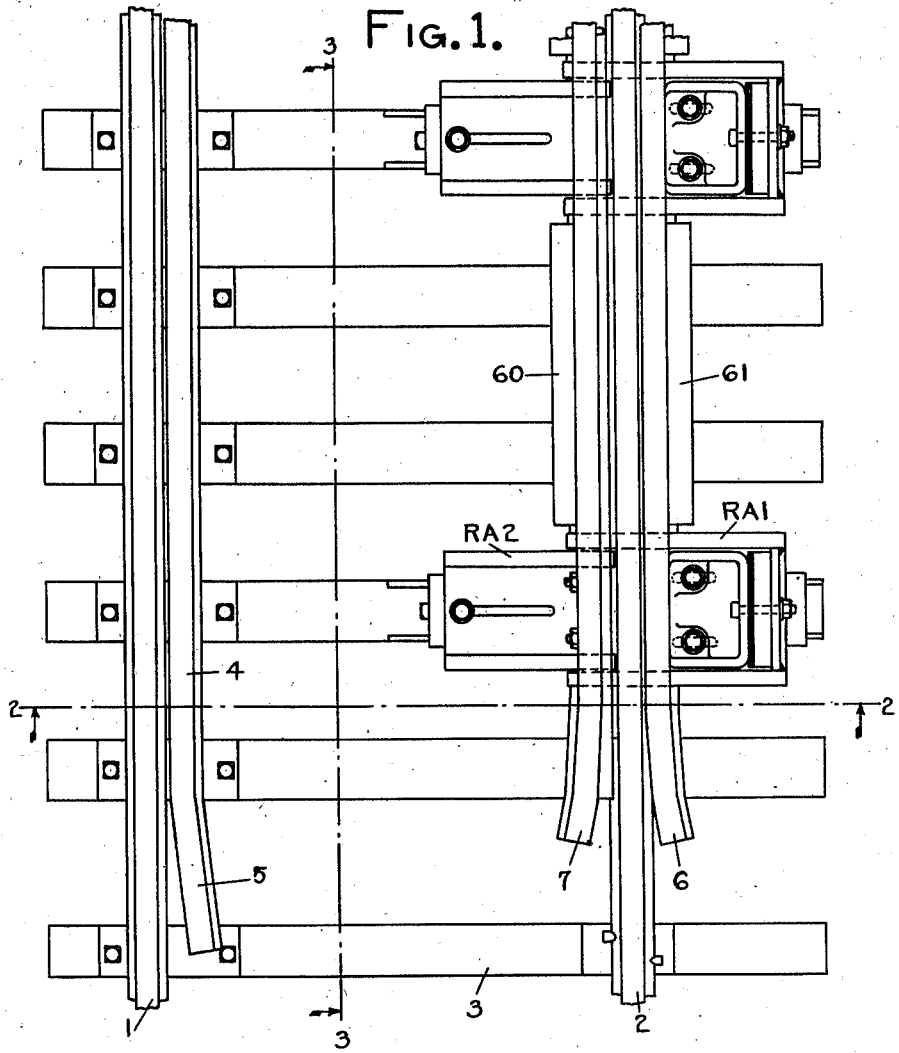
Fig. 1 is a plan view of a portion of one form of retarder, the "inert weight automatic" type, constructed in accordance with this invention.

Referring now to the drawings, and first to the form of invention shown in Figs. 1-5 inclusive, and known as the "inert weight automatic" type, there is shown a stretch of single track constituted by usual track rails 1 and 2, carried on ties 3. This retarder is a single rail retarder in that it is a complete unit for one of the running rails, and while it can be used in connection with both of the rails if desired, it has been shown as applied only to the rail 2.

A guide rail 4 is connected to the ties adjacent the running rail 1, and has an outwardly flaring end 5 for guiding car wheels upon entrance into the retarder.

Figure 2:
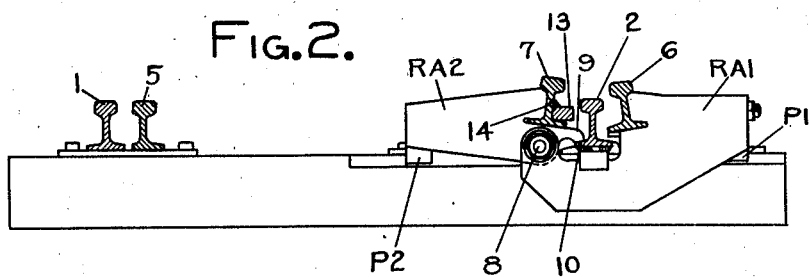
Fig. 2 is a sectional view, on line 2—2 of Fig. 1, and viewed in the direction of the arrows.

As seen in Fig. 2, the running rail 2 has positioned at each side of the same, a brake shoe, 6 and 7, these shoes being constituted by old track rails or the like, whereby to make for economy in operation and replacement of parts throughout the life of the retarder. The brake shoe 6 is carried by a rocker arm, or beam, or first support, designated generally as RA1, which is supported on a pivot P1 while the brake shoe 7 is carried by a rocker arm RA2 and is supported on a pivot or opposite movable support, designated generally as P2. These two rocker arms are interconnected by a pivot pin 8 at their inner ends and adjacent the base of the running rail to to thus constitute a collapsible beam, carried by the two pivots P1 and P2 at its ends, and prevented from dropping downwardly at the middle by a stop 9, which bears against the top face of the base 10 of the running rail.

With the structure as thus far described, the two brake shoes 6 and 7 being positioned when the stop is against the running rail to be spaced a lesser distance than the thickness of a car wheel, upon a car wheel attempting to enter between the brake shoes, this space must increase. Since it can do so only by the raising of the pivot point 8, the entire beam raises at the center as a car wheel enters, the flange 11 of the wheel as 12, (Fig. 5) riding up onto a shelf, or support, 13, fastened to the flange 14 of one of the brake shoes, such as 7, by any suitable means as by welding, as shown in the drawings. Thus, the car wheel and the entire weight carried by the wheel and the rocker arms, upon the wheel forcing itself between the brake shoes, are raised completely off of the running rail, as shown in Fig. 5, the wheel being supported primarily on the shelf 13, but of course partly by the frictional effect between the two sides of the wheel and the brake shoes.

Considering now somewhat in detail the construction of the various parts involved, it can be seen that the rocker arm RA2 is in section a channel shaped member having depending sides 15 and 16, positioned on opposite sides of a tie 3 with a top horizontal shelf or web 18 fastened to the sides, as by welding or the like, at 19. This rocker arm has the brake shoe 7 fastened to it as by bolts 20 passing through the inner upturned end 21 of web 18. The pivot pin 8 passes through the two side members 15 and 16, as clearly shown in Fig. 3.

The pivot point designated generally as P2, for the rocker arm RA2 is so constructed as to permit its ready movement toward and away from pivot pin 8. This pivot, with its movable means, comprises a bolt 22 slidable in a slot 23 in the shelf 18, and passing through a U-shaped bracket 24, having inturned ends 25, slidably received in longitudinal grooves 26, in the sides of the tie 3. Carried by tie 3 is a support plate 27, fastened securely on the top of the tie by lag screws or the like 28, with the bracket 24 straddling the plate, as clearly shown in Fig. 3.

Within the bracket 24 is a bearing or fulcrum block 29, fastened to bracket 24 as by welding or the like, as at 30, and having a slot 31 in its lower face to permit its sliding over the heads of the lag screws 28, and a slot 32 in its upper face for receiving the head of bolt 22. The lower face of block 29 is slightly curved to form a rugged, relatively large surfaced, bearing fulcrum member, contacting with the top face of the bearing plate 27.

It is clear that, by merely loosening the nut 33 on bolt 22, the bolt, together with its fulcrum member, can be moved inwardly toward the pivot pin 8 to thereby vary the distance of the fulcrum support for the rocker arm RA2, for adjustment purposes, to be described below.

The general construction of the rocker arm RA1 is similar to that of the other rocker arm in that it has depending side members 35 and 36 with a horizontal shelf or cover 37 interconnecting them and fastened to them as by welding. This rocker arm embraces the tie in the same manner as described for the other rocker arm, and below it is a bearing plate 38, fastened to the top of the tie by suitable means such as lag screws 39 for supporting the bearing or pivot P1. This pivot P1 is similar to pivot P2, but is not readily adjustable in position, and comprises a bracket 40 having inturned ends 41 received in grooves 42 in the support tie, and carries a fulcrum block 43 which bears against the bearing plate 38. This block 43 is grooved out to receive the head 44 of screw 39.

The member 45 is slidable on the shelf 37 by means of bolts 46 carried by member 45 and passing through slots 48 in shelf 37, the inner ends of the bolts 46 terminating in bolt heads constrained against turning by a side rail 47, welded, or otherwise secured, to the bottom face of shelf 37. Bolts 46 receive nuts 49 for securing the parts in place.

The inner end of the slidable member has a portion 50 to which the brake shoe 6 is securely fastened, as by bolts 51, a groove 52 being provided for receiving the base 53 of the rail constituting the brake shoe.

The outer end of the member 45 has an upturned flange 54 receiving a bolt 55 for connecting it, in spaced relation, to a flange 56 fastened to the shelf 37, the space between the flanges 54 and 56 receiving a filler block 58 and one or more shims 59, all for purposes to be described below.

As seen in Fig. 1, the brake beams 6 and 7 are continuous, and at various spaced points along their lengths are positioned the rocker arms for controlling the same. As shown, the rocker arms are positioned upon every fourth tie, and are connected to the brake shoes, as disclosed above. Between the successive rocker arms the brake shoes are stiffened and reenforced by strengthening members 60 and 61 which are fastened in place by welding or the like as at 62', to impart rigidity to the brake rails while allowing sufficient flexibility for them to perform their function, as will appear more clearly below.

For receiving end thrust, when a car enters the retarder, stop members 63, in the form of angle irons, are connected to the bottom of the running rail as by welding, as at 63¹. These stop members 63 are positioned against the outer faces of the side members 35 and 36 of the rocker arms RA1 whereby to permit movement of the rocker arm and hence of the connected parts, in a direction upwardly and at right angles with respect to the length of the rail, with the retarder members in effect being tied to the running rail as regards longitudinal or horizontal movement relative thereto.

As best seen in Fig. 3, the brake shoes carried by their rocker arms are positioned at a higher level than the running rails, except at the entrance and exit end of the retarder, at which two points they descend to the same level as the running rail, the exit end of the retarder being like the entrance end, the entrance end being shown in Fig. 1.

Consider now that a car has been pushed over the hump and enters the retarder, as described above. As a wheel enters between the horizontally flared ends of the brake shoes 6 and 7, the wheel flange rides up onto the shelf 13 and the brake shoes are pushed apart by the excess thickness of the wheel, whereby to raise the entire retarder at this point and thus raise the car wheel with its entire supported weight off of the track rail, as shown in Fig. 5. As the wheel passes through the retarder, it progressively spreads the brake shoes and raises the retarder, and the excess energy, which it is desired to extract from the moving car, is absorbed by the friction between the brake shoes and the sides of the wheel.

As explained above, the brake shoes constituted by track rails are flexible enough to permit this progressive movement of the wheel through the retarder, and the end thrust produced by the forwardly moving wheel, is received by the stop members 63, fastened to the running rails.

Considering the showing in Fig. 5, it can be seen that the weight supported by wheel 12, is all carried to and supported by, the two bearings P1 and P2. If the weight is considered carried at the point where the flange of the wheel is in contact with shelf 13, the proportion of the total wheel weight which is transferred to pivot P2 and here designated as W, is the same as that transferred to pivot point P1, if these two pivot points are equally spaced from the wheel flange in a horizontal direction. If they are unequally spaced, then the relative weights transferred to the pivots are inversely as the first power of their distances from the flange. Since the retarder is in equilibrium with the wheels supported by the retarder as shown in Fig. 5, we can take moments about the pivot pin 8. If we designate the force or pressure between the brake shoe 7 and the side of the car wheel as P, then, taking moments, $$Pa = Wb, \text{ and } P = W\left(\frac{b}{a}\right)$$

The quantities $a$ and $b$ of the formula are distances, $a$ being the vertical distance from the center of area of pressure to the center of pin 8, and $b$ the horizontal distance between the center of pin 8 and the center of pivot P2.

From the above it can be seen that the degree of retardation realized, is directly dependent upon the car weight, and upon the ratio of the distances $b$ to $a$. Hence, with a fixed position of the pivot P2, the retardation increases directly as the first power of the weight of the car. Furthermore, the effectiveness of whatever weight the car may have in producing retardation can be decreased by decreasing the distance $b$, that is, by moving the pivot P2 inwardly toward the pivot pin 8. Conversely, the effectiveness of weight in producing retardation can be increased by moving the pivot P2 outwardly away from the pivot pin 8. The distance $a$ of course is substantially constant throughout.

As shown in Fig. 5 the effectiveness of weight in producing retardation is a maximum for the particular construction shown, since the pivot P2 has been moved outwardly to its extreme position.

In a retarder of the character described above, the rotating wheel bearing with great force against the brake shoes, has a vertical frictional component which, if it is sufficiently great, will cause the car wheel to climb out of the retarder. The retarder, however, is so proportioned as to keep this vertical component of friction small enough to prevent the wheel from climbing out of the retarder.

It may occur that a car requires no retardation, and it is desirable for it to pass freely through the retarder. In this event, the retarder is opened up to be ineffective by means of removing block 58 and shims 59, loosening nuts 49 and sliding member 45, together with its brake shoe 6, backwardly away from the running rail. When it is desired to again cause the retarder to function, it is merely necessary to shift the slidable member 45 toward the rail, replace the blocks and shims, and tighten the nuts involved.

From time to time, the brake shoes may wear so as to unduly increase the distance between the brake shoes when the retarder is unoccupied, and to compensate for this shoe wear, additional shims, like shims 59, can be put in position, from time to time, and thus prolong the useful life of the brake shoe.

In Fig. 6 is shown a modified form of the "inert" type of retarder, as described above, wherein the weight carried by a car wheel is supported by the tread of the wheel, rather than by its flange, the retarder being the same as that above described, in principle and operation, and varying therefrom only in this one respect.

In Fig. 6, rocker arms 64 and 65 are pivoted together by a pin 66, and respectively carry brake shoes 67 and 68. In this form the running rail 69, supported on ties 70 in the usual manner, has a portion 71 of its head, cut away longitudinally, whereby to leave a portion 72 of the tread of a wheel 73 in an exposed condition as it passes over the running rail.

Carried by brake shoes 67 is a ledge or support 74 bolted, or the like, to the brake shoes as by bolts like 75, and positioned so as to support the car wheel as it rides into the retarder. Thus, the car wheel is supported clear of the running rail, and is carried by the retarder in much the same manner as described above in connection with the form wherein the flange supports the weight.

To receive the end thrust of the car as it rides through the retarder and prevent longitudinal displacement of the rocker arms and interconnected parts, a plate 76, in the form of a piece of angle iron, or the like, is fastened to the base of the running rail, as at 77, by welding or the like, and positioned to bear against the rocker arm 64 whereby to receive the end thrust and prevent undesirable displacement. These stop plates permit vertical removement of the retarder with respect to the running rail, while receiving the end thrust, and are employed in suitable number throughout the length of the retarder to satisfactorily accomplish their desired functions.

Referring now to Fig. 7, there is here shown another modified form of the "inert" type of retarder, wherein the running rail 77 supports the car wheel 78 as it rides through the retarder. The running rail is carried as at 79 by the retarder itself by being connected to, and supported by, one of the rocker arms, as 80. This rocker arm 80 is pivoted to the rocker arm 81 by a pivot 82, and the rocker arms carry brake shoes 83 and 84 whereby to produce retardation in the same general manner as described above.

In this form of the invention the running rail at the two ends of the retarder is connected to the entering and leaving portion of the running rail in a suitable flexible manner to permit the portion of the running rail in the retarder to rise slightly as the car enters the retarder, whereby to support the weight on the car wheel by the retarder, and raise it completely free from support by the ties. Since the vertical movement is but slight as the car enters the retarder, the usual running rail will be sufficiently flexible to permit of this movement, although, if desired, any convenient form of vertical slip joint can be employed for facilitating this vertical movement.

Referring now to Fig. 8, there is here shown a further modified form of the invention, like that of Figs. 1–5, in that the weight on a car wheel 85 is supported by means of its flange on a shelf 86 connected to one of the brake shoes 87, the other brake shoe 88 being positioned at the opposite side of the wheel in the usual manner.

In this form of invention, the rocker arm 89 is pivoted to the rocker arm 90 by a pivot pin 91, whereby the retardation is produced as described above in connection with Figs. 1–5 and the degree of retardation with a given weight supported by a car wheel is dependent upon the ratio of the lever arms, as described above. By moving the slidable fulcrum supporting the outer end of rocker arm 90, inwardly toward pivot pin 91, the degree of retardation is decreased.

In this form of invention, the two rocker arms 89 and 90 have additional pivot pin receiving openings 91, which, as shown, are in matching position and are positioned to the left and somewhat above the pivot pin 91. By removing pin 91 from its shown position and inserting it into the openings 92, a different lever ratio exists, and a wider range of variation can be realized, whereby to increase the flexibility and utility of the retarder.

It can be seen that, by shifting the pin 91 from its shown position to a position in the openings 92 the lever arm $a$, as employed before, has been considerably decreased so that the ratio of the lever arms $b$ to $a$, and hence the degree of retardation, can be varied over a new range by moving the supporting fulcrum for rocker arm 90 either toward, or away from, the pivot pin.

Referring now to Fig. 9, a further modified form of the invention is shown, wherein the arrangement, with regard to a wheel 93, the running rail 94, etc., is the same as described above in connection with Figs. 1–5.

In this form of invention, however, a more convenient means is provided for opening the retarder when it is desired that a car pass through without being retarded. This additional means comprises a lever 94[1], on the end of a pivoted rod 95 which can extend the length of the retarder and is carried in suitable bearing means 96.

At each of the points where rocker arms are employed, a toggle joint, comprised by arms 97 and 98, is employed with the arm 98 connected at one end to the rod 95 so as to turn therewith, the two arms being pivoted together at 99 and the free end of arm 97 being connected at 100 to an operating plate 101. This plate 101 is spaced from the plate 102, which is on the slide member which carries the brake shoe 103. Between plates 101 and 102 can be positioned various numbers of shims or spacers 104, whereby to compensate for wear on the brake shoe. The plates, together with their shims, are interconnected by suitable means, such as bolts 105, whereby it can be seen that operation of handle 94[1], in a clockwise direction, raises the breakdown pivot 99 of the toggle joint and withdraw the brake shoes 103 from a position adjacent the running rail 94, to permit a car to ride through the retarder without experiencing any retardation.

When it is desired to close up the retarder, handle 94 is operated to its shown position, whereby the break-down connection 99 is supported on a stop 106 in a position slightly below the horizontal so as to dependably hold the parts in their shown position and prevent any sliding movement of the brake shoe, upon a car riding through the retarder.

It is obvious that, if desired, motor or other power means can be employed for operation of the rod 95 so as to power operate the retarder to open position.

Referring now to Figs. 10–14, there is here shown a different form of retarder conveniently termed the "operated weight automatic" type which differs considerably from the forms described above. This form of retarder is a double-rail retarder in that the mechanism for each of the two rails constituting a stretch of single track cooperate both functionally and structurally.

The stretch of track to be equipped is constituted of usual track rails 106 and 107, supported on longitudinal steel girders or the like 108 and 108[1], by means of supporting I beams or the like 109 and 109[1], and all is supported on a usual road bed including ties, as T, or on a concrete base, or the equivalent, if desired. At each side of each rail is a brake shoe, brake shoes BS1 and BS2 being associated with rail 106, and brake shoes BS3 and BS4 being associated with rail 107. These brake shoes are formed with usual braking heads for producing friction against the sides of the wheels of a car passing through the retarder when the retarder is in its raised, active position. The brake shoes BS2 and BS3, at the inner sides of the track rails, are provided with supporting ledges or shelves 110 and 111 for supporting the weight carried by a car wheel by means of the flange of the wheel which ride up on these shelves as the car enters the retarder.

As shown in Fig. 10, the brake shoes flare outwardly at the entrance to the retarder as at 112 and 112¹ to permit a wheel to readily enter between the brake shoes with the wheel flange riding upwardly onto the ledge, which later slopes downwardly at the entrance of the retarder to be below the level of the wheel flange as the wheel enters.

The brake shoes are employed in relatively short sections of 6 to 8 feet each, and each section is carried by a brake beam as BB1, BB2, BB3 and BB4.

As best seen in Fig. 10, the brake shoes with their brake beams, constitute relatively long, narrow flat members with their longer dimensions paralleling the track rails, and with their adjacent ends slightly spaced from each other as at 112ª, to provide sufficient clearance to avoid breakage.

For supporting and operating the brake shoes and brake beams, there is provided a lever structure positioned crosswise of the track rails at each of the points 112ª where the brake shoes have their ends facing each other. Associated with each rail is a frame member such as the frame member FM1 for track rail 106, and FM2 for track rail 107. These frame members are substantially identical and comprise elongated beams, each passing under its rail, at 113 and 114, and at the outer side of each rail has a flat table-like supporting surface 115 and 116 for slidingly supporting each of the two adjacent ends of the two shoe beams at the outer sides of the rails. Carried by the supporting members on the frame members are grooved-out members 117 and 118, suitably bolted in place and furnishing slides 119 and 120 for receiving guiding flanges 121 and 122 on the brake beams whereby to permit the brake beams with their brake shoes to slide in a horizontal plane toward, and away from, the track rails.

Each of the frame members extends inwardly from its rail in an overlapping relation to the other, and each is supported by the other, so as to form a rigid beam so far as horizontal deflection is concerned. For example, the inner end 123 of frame member FM1 extends inwardly and between the bifurcated inwardly extending portions 124 and 125 of frame member FM2. At the inner end of each of the frame members is a broad bearing face 126 and 127 received respectively on broad, removable, saddle bearings 128 and 129 carried in openings in the other frame member. With this arrangement of parts, the inner ends of the frame members are each supported by the other and can slide horizontally either inwardly or outwardly like two telescopic members but together constitute a rigid beam bridged across between the two rails and rigid against downward deflection.

Pivotally connected to each of the frame members is a rocker arm as the rocker arm RA5, pivoted by a suitable pin 130 to frame member FM1, and the rocker arm RA6 pivoted by pin 131 to frame member FM2. Each of these rocker arms is, in general, triangular in shape with the upper inner angle terminating in a horizontally wide rocker bearing 132 and 133. Each of these rocker bearings is received in a rocker bearing socket 132¹ and 133¹, respectively, in the brake beams BB1 and BB4. These rocker bearings extend across the gaps at 112ª, between the adjacent ends of the brake beams and in effect, tie the structure together in an articulated manner. The lower faces 135 and 136 of the rocker arms extend generally in a horizontal direction, and are supported on movable, rugged, roller members 137 and 138, carried on axles 139 and 140, whereby to be readily moved in a manner to be described below.

The frame members on the portions at the inner sides of each of their rails have flat bearing faces 141 and 142 for carrying adjustable chair members CM1 and CM2. These chair members in turn have guide slots 143 and 144 for slidably guiding flanges 145 and 146 on the brake beams BB2 and BB3. In this manner the inner brake beams with their brake shoes can slide toward and away from the adjacent track rails.

As thus far described, it can be readily appreciated that the retarder will permit car wheels to enter between the brake shoes in much the same manner as described above in connection with the other forms of retarders described in this specification. The weight on the car wheels being carried by the supporting shelves on the inner brake shoes will tend to cause the central portion of the retarder to drop and squeeze the wheels between the brake shoes as the rocker arms, supported by their rollers, rotate on their pivot pins, the outer brake shoes being held against the car wheels by the rocker bearings between the rocker arms and their brake beams.

In the case of this "operated" type of retarder, the weight carried by each wheel, though shown as being carried by the flange of the wheel riding on a support shelf on one of the brake shoes, can, of course, be supported in other ways, as disclosed above in connection with the "inert" type of retarder. That is, it can be supported by a shelf on a brake shoe on which the tread of the wheel rides, or by supporting the track rail by the retarder, with the rail and its supported wheel being lifted up, clear of the ties and foundation.

Figures 11, 12:
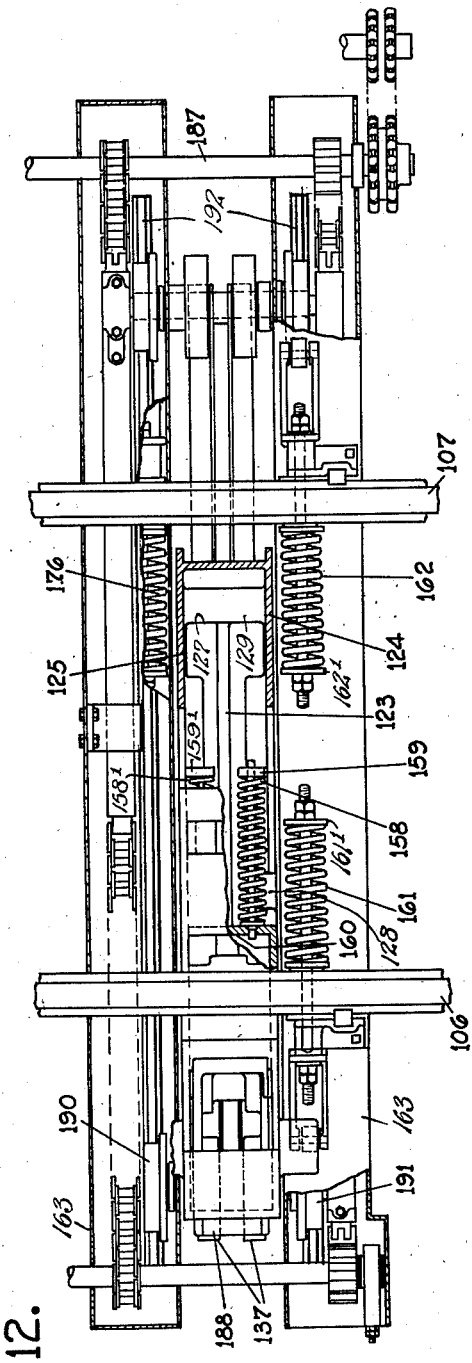
Fig. 11 is a sectional view, on line 11—11 of Fig. 10, and viewed in the direction of the arrows, with parts broken away, and parts left in elevation.
Fig. 12 is a fragmentary plan view with parts broken away.
Figure 13:
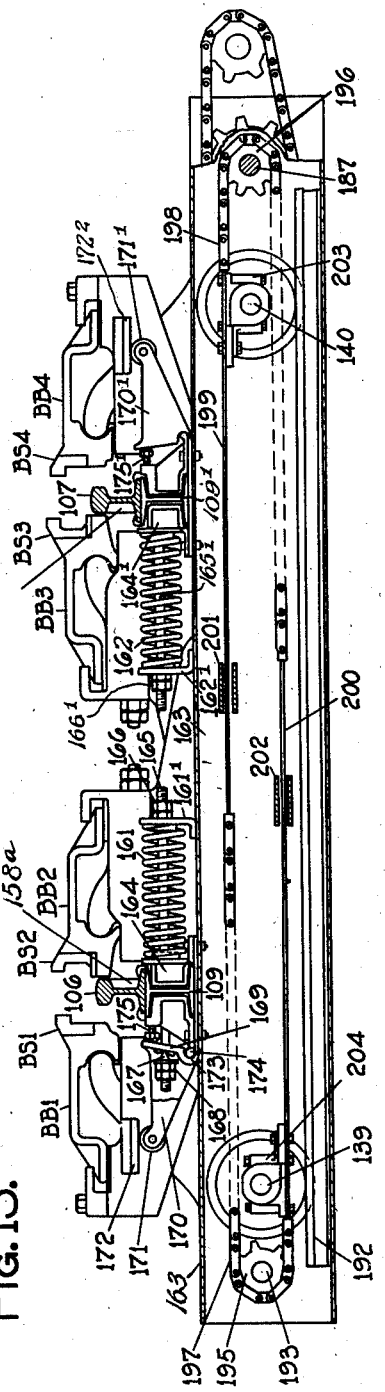
Fig. 13 is a sectional view on the line 13—13 of Fig. 10, and viewed in the direction of the arrows with parts broken away, and parts left in elevation.

The brake shoes are normally positioned spaced apart the thickness of a normal car wheel, whereby, when a car is in the retarder, the parts assume the positions shown in Fig. 11, for example. If a car wheel be extra thick the brake shoes will be forced apart, and the entire retarder will be raised slightly higher. If the wheel, however, be thinner than normal, the entire retarder will be slightly lower than as shown in Fig. 11.

Before continuing with the description of the various adjusting and positioning parts of the retarder, it may be in the interest of clarity to consider the retarding effect realized in this form of structure.

In Fig. 11 have been shown car wheels 147 and 148, in position in the retarder. If we assume uniform loading of the car, half of the weight carried by an axle is carried by each of the wheels. For example, wheel 147 can be considered to carry a weight W1, while wheel 148 carries a weight W, and these two weights are equal.

The pressure between the brake shoe BS4, for example, and wheel W, represented by P, tends to turn the rocker arm in a clockwise direction about its rocker bearing 133. This rotational effect is balanced by a resulting force F, acting upwardly on flange 122 of brake beam BB4, and hence the force P can be considered as transferred, horizontally, downwardly, to the center of the rocker bearing 133 between the brake beam and its rocker arm.

Since all of the parts are in equilibrium, we can take moments about the pivot pin 131, with the result:

$$Pa = Wb$$

Solving this equation, we obtain:

$$P = \left(\frac{b}{a}\right)W$$

In this formula, the quantity $a$ is the vertical distance between pivot pin 131 and the point of application of the force P at the center of rocker bearing 133, and the quantity $b$, is the horizontal distance between the point where the rocker arm is supported by its roller and the pivot pin 131.

From the above, it follows that the degree of retardation, which is proportional to the quantity P, varies directly as the first power of the car weight. Furthermore, for any given weight the effectiveness of this weight in producing retardation is dependent upon the ratio of the distances $b$ to $a$. In adjusting the roller distance from the pivot pin 131, the quantity $b$ can be decreased and increased whereby to decrease and increase the degree of retardation realized, since the distance $a$ remains substantially constant regardless of the position of the roller.

As a car wheel passes through the retarder, it not only moves forward, but rotates, and the rotation of the wheel produces a vertical frictional component between the wheel and the brake shoe, which, if sufficient in amount, can cause the car to climb out of the retarder. Accordingly, the retarder is constructed with such lever ratios as to maintain this vertical frictional component too small to cause the wheel to climb out of the retarder.

The inner brake shoes BS2 and BS3 are supported on their chairs, as described above, and are slidable thereon in a horizontal direction toward and away from the track rails and each has a bearing socket 149 and 150 for receiving a rocker bearing 151 and 152 on the chairs, similar to the horizontally broad rugged bearings described above in connection with the outer brake beams.

From time to time, the brake shoes will wear down to thus unduly increase the space between them when the retarder is unoccupied, and to adjust for this shoe wear compensating means is provided for each of the inner brake shoes. For example, the brake shoe BS3 can be advanced to assume a new initial position with reference to the track rail by means of a bolt $152^1$ passing through lugs 153 and 154 on its frame member and having its threaded end passing through a flange 155 on its chair member, and carrying nuts 156 on the end thereof. The head 157 of the bolt bears against the outer face of lug 154, whereby the chair, together with its carried brake beam and brake shoe, can be moved toward the track rail by merely taking up on the nuts 156.

The brake shoe BS2 is adjustable for shoe wear in the same manner as described just above.

In order that a car on entering the retarder will always have the flanges of its wheels ride up onto the supporting shelves, means to assure this are provided in the form of two spreading springs 158 and $158^1$. These springs are under compression and are held between lugs 159, and the long lug 160, the first two being carried by the frame member FM2, and the last one by frame member FM1, whereby to slide these frame members outwardly in a horizontal direction and at right angles to the track rails, so as to force the brake beams BB2 and BB3 against the track rails. To prevent any possibility of the brake beams being forced under the head of the rails, fillets $158^a$ and $158^b$ are provided, and are connected to the webs of the rails as by welding, or the like.

Since the retarder is arranged to give a degree of retardation dependent upon the weight of the car being retarded, and since the entire retarder is supported by its rollers, unless means be provided to compensate for the dead weight of the retarder, this dead weight will produce retardation in addition to that produced by the weight of the car.

For example, in the case of a loaded car, the weight on a car axle may be 50,000 lbs., while with an empty car, it may be in the order of 10,000 lbs. If the dead weight of the retarder, for the length of retarder corresponding to an axle, be in the order of 6,000 lbs., then the dead weight retardation adds 60 per cent, to the retardation which the empty car itself produces, while it adds only 12 per cent of dead weight retardation to the retardation which the loaded car produces. Thus, the retardation is not even approximately in accordance with the car weight unless the dead weight of the retarder be cared for.

To rectify the above situation, means is provided for supporting the dead weight of the retarder in the form of heavy springs, one at each side of each frame member, thus making four springs in all, for each pair of frame members. Three of these springs, 161, 162 and 176, are shown in the drawings while the fourth spring is not shown. The springs function similarly and considering frame member FM1, for example, which is partly supported by spring 161 positioned at one of its sides, this spring 161 is under compression and is held at one end by a slidable member $161^1$ which is free to move to the right on its support which is the top of a fixed housing 163 (Fig. 13), and at the other end by the web of the support 109, and is backed up with a filler block 164. It is sleeved on a threaded rod 165, carrying nuts 166 on its end and to the outer side of slide $161^1$. The other end of rod 165 carries a bearing member 167, held in place by nuts 168 with the bearing member bearing against an arm 169 of a bell crank with the other arm 170 carrying a roller 171, bearing against a shelf or support 172, carried by the outer end of frame member FM1.

The bell crank lever has a rocker socket 173 received on a rocker bearing 174, whereby spring 161 tends to rock the bell crank lever arm 170 upwardly to exert a vertically upward force on the under face of support 172. An adjustable stop means, in the form of a screw 175, is provided for limiting the movement of the bell crank lever.

The associated frame member FM2 is likewise supported by the spring 162 at one side and a spring 176 at its other side. This spring 162 has associated with it the identified parts $162^1$, $109^1$, $164^1$, $165^1$, $166^1$, $170^1$, $171^1$, $172^1$ and $175^1$. With this arrangement of parts, it can be seen the spring tension of these support springs can be readily adjusted, whereby to position the entire retarder structure at its desired level. The springs are ordinarily so adjusted as to support the entire structure at the level it assumes when a car with wheels of normal thickness, say 5½ inches, is in the retarder, whereby the above referred to dead weight retardation is entirely eliminated, and the retardation is exactly in proportion to the weight of the car. Car wheels vary in thickness, in practice, by possibly ¼ inch in each direction, from the normal. Thus, with a thicker than normal wheel, the retarder is raised higher than normal and a portion of dead weight retardation will be added to that produced by the car weight. With a thinner than normal wheel, the retarder will be lower than normal, and the springs will relieve a small portion of retardation which the car weight tends to produce. By using relatively long supporting springs, however, a slight difference in car wheel thickness does not vary the retardation produced by the car weight itself to any material extent.

Figure 14:
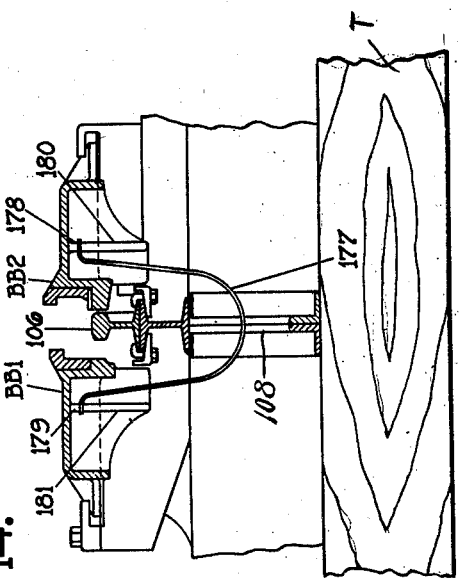
Fig. 14 is a sectional view on line 14—14 of Fig. 10, and viewed in the direction of the arrows.

In order that the brake beams be biased against their rocker bearings, so as to avoid undue wear and noise, and incorrect initial position of parts, when a car enters the retarder, a biasing means is provided in the form of a flat U-shaped leaf spring 177 (see Fig. 14). This spring has ends 178 and 179 received in webs 180 and 181, integral with the two brake beams BB1 and BB2 at the opposite sides of track rail 106. The spring exerts an outward pressure on the brake beams tending to push them away from each other, and thereby against their limiting rocker bearings.

As described above, in order to vary the effectiveness of a given weight of car in producing retardation, the rollers supporting the rocker arms are adjustable in position. A means for readily adjusting these rollers, despite the large forces involved therein, has been provided in accordance with the present invention.

As seen best in Fig. 10, a prime mover, in the form of an electric motor 182, is provided, which operates through reduction gearing 183, and chain drivers 184 and 185 to operate shafts 186 and 187 in either direction, the motor being of the reversible type and having any suitable local or remote control means. While the motor has been shown near one end of the retarder, for convenience, in showing the same on this figure of the drawings, when employed in practice, the motor would preferably be located midway of the ends of the retarder, and the shafts 186 and 187 would extend from the center of the retarder parallel thereto and to its respective ends.

The rollers for supporting the rocker arms, as rollers 137, are formed of two separate members with a space 188 therebetween, whereby to permit a strengthening web 189 on the rocker arm, and various webs and strengthening means on the frame members (not shown) to be received therebetween. These rollers are carried on shaft 139 and at each end of the shaft is a supporting wheel 190 and 191 positioned to travel on rails 192 positioned crosswise of the track rails and housed in and supported by the bottom of the housing 163 which in turn are supported on the road bed or special foundation, in common with the track rails. Thus, each rocker arm spans across between the adjacent ends of two brake beams and is supported by what might be considered a split roller carried on a shaft supported by two wheels running on tracks laid crosswise of the tracks and adjacent the ends of the brake beams. Spaced to the outside of the axle 139, for each transverse section of retarder, is an idler shaft 193, suitably supported and carrying a sprocket wheel 195, receiving a chain 197 with drive sprocket wheel 196 receiving a chain 198. These two chains are interconnected by flat plate-like rods 199 and 200, carried in guides 201 and 202 for holding them in line during operation.

The chains 198 and 197 are connected respectively, to the axles 140 and 139 by clamp means 203 and 204, whereby to move the axles with the chains. This same arrangement exists at each end of each of the two axles, as also does the sprocket wheels, etc. Upon drive shaft 187 rotating clockwise, for example, the idler shaft 193 also rotates clockwise whereby chain 198 moves roller axle 140 to the right and chain 197 moves roller axle 139 to the left, as viewed in Fig. 13. Thus, the rollers are moved, in each case, to increase the degree of retardation. Reverse rotation of the drive shaft 187, of course, operates to move the rollers toward each other, so as to decrease the degree of retardation exerted on the wheels on each of the two track rails.

It can be seen that, on pulling chain 198 to the right, since this chain is not in line with the center of axle 140, a torque is produced which tends to make the parts bind, and to maintain the pull in proper alignment, the rigid members 199 and 200 are employed and since they are rigid and are guided by guides 201 and 202, they maintain the pull accurately in line.

Thus it can be realized that a very simple, dependable, and nevertheless rugged means is provided for operating the roller so as to either increase or decrease the degree of retardation in the manner desired and contemplated.

For permitting cars to pass over the tracks equipped with retarders of this type without being subjected to retardation, and to permit the passage of locomotives in which the clearances are not such as to otherwise avoid damage to the retarder and the locomotive, means is provided for placing the retarder in inoperative position. With the employment of the supporting springs for relieving the dead weight retardation, the retarder cannot be lowered under the force of gravity, so as to move out of the way of locomotives and the like, when passing over the track rail. Accordingly, a cam means has been provided which forcibly and positively lowers the retarder so as to permit such passage.

Each of the frame members FM1 and FM2 is provided with a bracket 205 and 206 for receiving an inner end 207 and 208 of cam runways CR1 and CR2. These cam runways are supported on bearings 209 and 210 supported from the road bed or special foundation, at their other ends, and are positioned to receive the rollers as they are moved inwardly or outwardly on a ledge trackway 211 and 212. These ledge trackways are inclined upwardly from their outer to their inner ends, whereby the roller tends to ride upwardly on the trackways.

The wheels on the axles carrying the rollers are constrained against upward movement of more than a fraction of an inch by the under face of flanges 213 on girder 163 bearing on their top edges, whereby to maintain the travel of the roller axles in a substantially horizontal plane.

Furthermore, upon the rollers being moved inwardly toward the track rails to a position just beyond the pivot pins 130 and 131, the rocker arms can rock their outer ends downwardly under the force of gravity, to thereby allow the outer brake beams to move away from the track rails, under their spring bias. The frame members have clearance spaces above the tops of the wheels, as the axles move inwardly beyond the pivot pins. Thus, the rollers, operating on the inclined portions 215 and 216 of the cam runways exert downward pulls on the brackets 205 and 206, whereby to lower the entire retarder structure against the upward pressures exerted by the bell crank levers and the supporting springs.

Upon moving the rollers outwardly so as to support the rocker arms, the supporting springs re-position the retarder at its normal height.

The above rather specific description of several forms which this invention can assume has been given solely by way of example and is not intended in any manner whatsoever in a limiting sense. It is to be understood that various modifications and adaptations as may from time to time appear desirable, are intended to be covered by the present disclosure insofar as they are not specifically excluded therefrom by the appended claims.

Having disclosed my invention, I now claim:

1. In a car retarder of the track brake type, for cooperation with a track rail, a first support at one side of a track rail, an opposite movable support at the other side of the track rail, a rocker arm supported at one end on the movable support and extending toward the track rail, a brake shoe operatively connected to the rocker arm and positioned above and adjacent one side of the track rail, a beam supported at one end by the first support and extending toward the track rail, a brake shoe carried by the beam and positioned above and adjacent the other side of the track rail and spaced from the other brake shoe a distance less than the thickness of a car wheel, shelf means on one of the brake shoes for supporting a car wheel clear of the track rail, and a pivot pin interconnecting the rail ends of the arm and beam and positioned so that the entire retarder structure is supported solely by said two supports when a car wheel is in the retarder.

2. In a car retarder of the track brake type, for cooperation with a track rail, a first support at one side of a rail, an opposite movable support at the other side of the rail, a rocker arm resting at one end on the movable support and extending toward the rail, a brake shoe constituted by a track rail and operatively connected to the rocker arm and positioned adjacent and above one side of the rail, a beam carried at one end by the first support and extending toward the rail, a brake shoe constituted by a track rail and carried by the beam adjacent and above the other side of the rail, and spaced horizontally from the other shoe, a distance less than the thickness of a car wheel, shelf means on one of the brake shoes for supporting a car wheel clear of the rail, a pivot pin interconnecting the rail ends of the arm and beam and positioned so that the entire retarder structure is supported solely by said two supports when a car wheel is in the retarder, and adjusting means to move said movable support toward, and away from, the said pivot pin.

3. In a car retarder of the track brake type, for cooperation with a track rail, a first support at one side of the rail, an opposite, movable, support at the other side of the rail, a rocker arm resting at one end on the movable support and extending toward the rail, a brake shoe operatively connected to the rocker arm and positioned above and adjacent one side of the rail, a beam carried at one end by the first support and extending toward the rail, a brake shoe carried by the beam above and adjacent the other side of the rail and spaced horizontally from the other brake shoe a distance less than the thickness of a car wheel, shelf means on one of the brake shoes positioned below the flange for a car wheel passing through the retarder for supporting a car wheel by its flange and clear of the rail, and a pivot pin interconnecting the rail ends of the arm and beam and positioned so that the entire retarder structure is supported solely by said two supports when a car wheel is in the retarder.

4. In a car retarder of the track brake type, for cooperation with a track rail, a first support at one side of the rail, an opposite movable support at the other side of the rail, a rocker arm resting at one end on the movable support and extending toward the rail, a brake shoe operatively connected to the rocker arm and positioned above and adjacent one side of the rail, a beam carried at one end by the first support and extending toward the rail, a brake shoe carried by the beam and positioned above and adjacent the other side of the rail, and spaced horizontally from the other brake shoe a distance less than the thickness of a car wheel, support means on one of the brake shoes positioned below the tread of a wheel passing through the retarder for supporting a car wheel, by its tread, and clear of the rail, and a pivot pin interconnecting the rail ends of said arm and beam and positioned so that the entire retarder structure is supported solely by said two supports when a car wheel is in the retarder.

5. In a car retarder of the track brake type, for cooperation with a track rail, a track rail, a first support at one side of a rail, an opposite movable support at the other side of the rail, a rocker arm resting at one end on the movable support and extending toward the rail, a brake shoe operatively associated with the rocker arm and positioned above and adjacent one side of the rail, a beam carried at one end by the first support and extending toward the rail, a brake shoe carried by the beam and positioned above and adjacent the other side of the rail and spaced from the other shoe a distance less than the thickness of a car wheel, means for supporting the track rail on said arm and beam, and a pivot pin interconnecting the rail ends of said arm and beam and positioned so that the entire retarder structure is supported solely by said two supports when a car wheel is in the retarder.

6. In a car retarder of the track brake type, for cooperation with a track rail, a first support at one side of a rail, an opposite movable adjustable support at the other side of the rail, a rocker arm resting at one end on the movable support and extending toward the rail, a brake shoe operatively connected to the rocker arm and positioned above and adjacent one side of the rail, a beam carried at one end by the first support and extending toward the rail, a brake shoe carried by the beam above and adjacent the other side of the rail and spaced from the other shoe a distance less than the thickness of a car wheel, support means on one of the brake shoes for supporting a car wheel clear of the rail, a pivot pin interconnecting the rail ends of the arm and beam and positioned so that the entire retarder structure is supported solely by said two supports when a car wheel is in the retarder, and matching openings in the beam and arm, spaced from the pivot pin, for alternatively receiving said pivot pin, to thereby vary the mechanical advantage of the retarder in producing retardation.

7. In a car retarder of the track brake type, for use on the two track rails of a stretch of single track supported on a road bed, a support associated with each rail and each positioned to the outer side of, and spaced from, its rail, a rocker arm for each rail and each carried by its support at its one end and having its other end extending toward its rail, a frame member for each rail extending from the outer side of its rail, inwardly of its rail toward the other rail so as to have their inner ends in overlapping relation, a bearing on the inner end of each frame member supporting the inner end of the other frame member so as to constitute an extensible, longitudinally slidable beam rigid against downward deflection and spaced above the road bed, a pivot pin connecting each rocker arm to its adjacent frame member and positioned spaced from the road bed, a pair of elongated brake beams and brake shoes with their ends adjacent each other, at each side of each rail, means at each side of each rail on each frame member for supporting the adjacent ends of two brake beams, the brake beams at the outer sides of the rails being slidable on their frame supports, and rocker bearings operatively connecting each rocker arm with the two adjacent ends of the adjacent brake beams at the outer sides of the rails.

8. In a car retarder of the track brake type, for use on the two track rails of a stretch of single track supported on a road bed, a road bed support associated with each rail and each spaced from, and at the outer side of, its rail, a rocker arm for each rail and each carried by said support at one of its ends and having its other end extending toward its rail, a frame member for each rail extending from the outside of its rail, inwardly of its rail, and toward the other rail to position their inner ends in overlapping relation, a bearing on the inner end of each frame member supporting the inner end of the other frame member, so as to constitute a longitudinally slidable and collapsible beam, rigid against downward deflection, and spaced above the foundation, a pivot pin connecting each rocker arm to its adjacent frame member and positioned to be spaced above the foundation, two elongated brake beams and brake shoes with their adjacent ends slightly spaced from each other at each side of each rail, means at each side of each rail on each frame member for movably supporting the adjacent ends of the beams and shoes, the beams at the outer sides of the rails being horizontally slidable on their frame support means, elongated rocker bearings operatively connecting each rocker arm with the two spaced ends of the adjacent brake beams at the outer sides of the rails, an elongated rocker bearing on each frame member operatively connecting the frame members to the adjacent ends of the brake beams at the inner sides of the rails, means on one shoe for each rail to support a car wheel clear of the rail, and means for simultaneously moving each of said road bed supports toward or away from the adjacent pivot pin.

9. In a car retarder of the track brake type, for use with the two track rails of a stretch of single track supported on a road bed, a road bed support for each rail, each spaced from, and to the outer side of, its rail, a rocker arm for each rail, each carried by a said support at one end and having its other end extending toward its rail, a frame member for each rail extending from the outer side of its rail, inwardly of its rail toward the other rail, to position their inner ends in overlapping relation, a removable bearing on the inner end of each frame member supporting the inner end of the other frame member, so as to constitute a longitudinally slidable beam which is rigid against downward deflection, and spaced above the road bed, a pivot pin connecting each rocker arm to its adjacent frame member and positioned to be spaced above the road bed, a brake beam carrying a brake shoe at each side of each rail, means at each side of each rail on each frame member for supporting the brake beams and shoes, the beams at the outer sides of the rails being horizontally slidable on their frame supports, bearings operatively connecting each rocker arm with the adjacent brake beam at the outer side of the rail, means on one shoe for each rail to support a car wheel clear of the rail, and power operated means including a shaft and a single flexible drive loop driven by the shaft and connected to each of the road bed supports for simultaneously moving each support nearer to or further from the adjacent pivot pin.

10. In car retarders of the track brake type, for use with the two track rails of a stretch of single track supported on a road bed, a road bed support associated with each rail and spaced from, and to the outer side of, the rail, a rocker arm for each rail, each carried by a support at one end, and having its other end extending toward its rail, a frame member for each rail extending from the outer side of its rail inwardly of its rail toward the other rail to position their inner ends in overlapping relation, a horizontal bearing near the inner end of each frame member supporting the inner end of the other frame member so as to constitute a longitudinally slidable beam, rigid against downward deflection, and spaced above the road bed, a pivot pin connecting each rocker arm to its adjacent frame member and positioned to be spaced above the road bed, a brake beam carrying a brake shoe at each side of each rail, means at each side of each rail on each frame member, for supporting one of the brake beams, the beams at the outer sides of the rails being horizontally slidable on their frame supports, rocker bearings operatively connecting each rocker arm with the adjacent brake beam at the outer side of the rail, means on one shoe for each rail to support a car wheel clear of the rail, means for simultaneously moving each road bed support nearer to or further from the adjacent pivot pin, and means for adjusting the positions of the two inside brake beams on their frame supports for compensating for shoe wear.

11. In a car retarder of the track brake type, for use with the two track rails of a stretch of single track supported on a road bed, a main support carried by the road bed for each rail and spaced from, and at the outer side of, each rail, a rocker arm for each rail, each carried by a support at one end and having its other end extending toward its adjacent rail, a frame member for each rail extending from the outer side of its rail inwardly of its rail toward the other rail so as to position their inner ends in overlapping relation, a bearing near the inner end of each frame member supporting the inner end of the other frame member, so as to constitute a longitudinally slidable beam which is rigid against downward deflection, and spaced above the road bed, a pivot pin connecting each rocker arm to its adjacent frame member and positioned to be spaced above the road bed, a brake beam carrying a brake shoe at each side of each rail, means at each side of each rail on each frame member supporting a brake beam, the beams at the outer sides of the rails being slidable on their frame supports, bearings operatively connecting each rocker arm with the adjacent brake beam at the outer side of the rail, means on one shoe for each rail for supporting a car wheel clear of the rail, means for simultaneously moving each road bed support closer to or further from the adjacent pivot pin, and elastic means positioned between the road bed and each outer end of each frame member and supporting the dead weight of the entire retarder structure from and above the road bed.

12. In a car retarder of the track brake type, for use with the two track rails of a stretch of single track supported on a road bed, a main support carried by the road bed for each rail and spaced from, and at the outer side of, each rail, a rocker arm for each rail, each carried by one of the supports at one end and having its other end extending toward its rail, a frame member for each rail extending from the outer side of its rail inwardly of its rail toward the other rail so as to position their inner ends in overlapping relation, a bearing near the inner end of each frame member supporting the inner end of the other frame member so as to constitute a longitudinally slidable beam, substantially rigid against downward deflection, and spaced above the road bed, a pivot pin connecting each rocker arm to its adjacent frame member and so positioned as to be spaced above the road bed, a brake beam carrying a brake shoe and positioned at each side of each rail, means at each side of each rail on each frame member supporting a brake beam, the beams at the outer sides of the rails being horizontally slidable on their frame supports, bearings operatively connecting each rocker arm with the adjacent brake beam at the outer side of the rail, means on the shoes for each rail to support a car wheel clear of the rail, power operated means including a drive shaft and a single flexible drive loop driven from the shaft and connected to each of the main supports for simultaneously moving each support nearer to or further from the adjacent pivot pin, and elastic means positioned to exert force between the road bed and the outer end of each frame member for supporting the dead weight of the entire retarder structure from the road bed.

13. In a car retarder of the track brake type, for use with the two track rails of a stretch of single track supported on a road bed, a main support associated with each rail and spaced from, and to the outer side of, each rail, a rocker arm for each rail, each carried by a said support at one end and having its other end extending toward its rail, a frame member for each rail extending from the outer side of its rail inwardly of its rail toward the other rail so as to position their inner ends in overlapping relation, a bearing near the inner end of each frame member supporting the inner end of the other frame member so as to constitute a longitudinally slidable beam which is rigid against downward deflection, and spaced above the road bed, a pivot pin connecting each rocker arm to its adjacent frame member and positioned to be spaced above the road bed, a brake beam carrying a brake shoe, at each side of each rail, substantially horizontally positioned means at each side of each rail on each frame member for supporting the brake beams, the beams at the outer sides of the rails being slidable on their frame supports, bearings operatively connecting each rocker arm with the adjacent brake beam at the outer sides of the rail, means on the said retarder parts for each rail to support a car wheel clear of the rail, power operated means including a drive shaft and a single flexible drive loop driven by the shaft and connected to each of the said main supports for simultaneously moving each support nearer to or further from the adjacent pivot pin, and elastic means reacting against the road bed and acting on each of the frame members for supporting the entire weight of the entire retarder structure, at the elevation above the road bed that it assumes when car wheels of normal thicknesses are in the retarder.

14. In a car retarder of the track brake type, for use with the two track rails of a stretch of single track supported on a road bed, a main support for each rail spaced from, and at the outer side of, each rail, a rocker arm for each rail, each carried by a said support at one end and having its other end extending toward its rail, a frame member for each rail extending from the outer side of its rail inwardly of its rail toward the other rail so as to position their inner ends in overlapping relation, a removable bearing near the inner end of each frame member for supporting the inner end of the other frame member, whereby to constitute a longitudinally telescoping beam which is substantially rigid against downward deflection, and spaced above the road bed, a pivot pin connecting each rocker arm to its adjacent frame member and positioned to be spaced above the road bed, a brake beam carrying a brake shoe positioned at each side of each rail, level support means at each side of each rail on each frame member and supporting the brake means, the beams at the outer sides of the rails being slidable on their frame supports, bearings operatively connecting each rocker arm with the adjacent brake beam at the outer side of the rail, means on each brake shoe at the inner sides of the rails to support a car wheel clear of the rail, means for simultaneously moving each main support nearer to or further from its adjacent pivot pin, and elastic means biasing each of the frame members toward its rail.

15. In a car retarder of the track brake type, for use with the two track rails of a stretch of single track supported on a road bed, a main support carried by the road bed for each rail and spaced from, and to the outer side of, each rail, a rocker arm for each rail and each carried by a said support at one end and having its other end extending toward its rail, a frame member for each rail extending from the outer side of its rail inwardly of its rail toward the other rail so as to position their inner ends in overlapping relation, a bearing near the inner end of each frame member supporting the inner end of the other frame member so as to constitute a longitudinally extensible and compressible beam which is relatively rigid against downward deflection, and spaced above the road bed, a pivot pin connecting each rocker arm to its adjacent frame member and positioned to be spaced above the road bed, a brake beam, carrying a brake shoe, at each side of each rail, means at each side of each rail on each frame member for supporting the brake beams, the beams at the outer sides of the rails being slidable on their frame supports, bearings operatively connecting each rocker arm with the adjacent brake beam at the outer side of the rail, means on the shoe at the inner side of each rail to support a car wheel clear of the rail, power operated means including a drive shaft and a single flexible drive loop driven from the shaft and connected to each of the said main supports, for simultaneously moving each support nearer to or further from the adjacent pivot pin, and elastic means biasing each of the frame members towards its rail.

16. In a car retarder of the track brake type, for use with the two track rails of a stretch of single track supported on a road bed, a main support associated with each rail and spaced from, and to the outer side of, each rail, a rocker arm for each rail, each of which is carried by a said support at one of its ends and having its other end extending toward its rail, a frame member associated with each rail and extending from the outer side of its rail, inwardly of its rail toward the other rail so as to have their inner ends in overlapping relation, a bearing near the inner end of each frame member supporting the inner end of the other frame member so as to constitute a longitudinally slidable extensible beam which is relatively rigid against downward deflection, and spaced above the road bed, a pivot pin connecting each rocker arm to its adjacent frame member and positioned spaced above the road bed, a brake beam carrying a brake shoe positioned at each side of each rail, support means at each side of each rail on each, respectively, of the frame members for supporting the brake beams, the beams at the outer sides of the rails being slidable on their frame supports, bearings operatively connecting each rocker arm with the adjacent brake beam at the outer side of the rail, means on the arm and frame assembly for each rail for supporting a car wheel clear of its rail, said main supports each being constituted by a roller, an axle carrying each roller, wheels on each axle, a track for the wheels, a drive shaft, a closed drive loop driven by the shaft and passing around each of the axles and connected at one point to each shaft, for moving the rollers relatively to their adjacent pivot pins.

17. In a car retarder of the track brake type, for use with the two track rails of a stretch of single track which is supported on a bed, a main bearing, supported from the bed, for each rail and spaced from, and at the outer side of, its rail, a rocker arm associated with each rail and each carried by a main bearing at one end and having its other end extending toward its rail, a frame member associated with each rail and extending from the outer side of its rail inwardly of its rail toward the other rail so as to position their inner ends in overlapping relation, a saddle bearing near the inner end of each frame member and supporting the inner end of the other frame member so as to constitute a longitudinally slidable extensible beam which is relatively rigid against downward deflection and is spaced above the bed, a pivot pin connecting each rocker arm to its adjacent frame member and positioned spaced above the bed, a brake beam at each side of each rail, a brake shoe on each beam, means at each side of each rail on each of the frame members for supporting the brake beams, the beams at the outer side of the rails being slidable on their frame supports, rocker bearings operatively connecting each rocker arm with the adjacent brake beam at the outer side of the rail, means on one of the shoes associated with each rail for supporting a car wheel clear of its rail, said main bearings each being constituted by a roller, an axle carrying each roller, a pair of wheels on each axle, a track for the wheels, a drive shaft, a closed drive loop driven by the shaft and passing around the shaft and each of the axles and connected at its top, and its bottom, respectively, to the said shafts, and an idler within the loop and spaced beyond the shaft more remote from the drive shaft, whereby to simultaneously move the rollers nearer to or further from their adjacent pivot pins.

18. In a car retarder of the two rail, track brake type, for use on a stretch of single track supported from a bed, a main bearing carried by the bed and associated with each rail and spaced from, and at the outer side of, each rail, a rocker arm associated with each rail and each carried by a said bearing and extending toward its rail, a frame member associated with each rail and extending from the outer side of its rail inwardly of its rail toward the other rail so as to position their inner ends in overlapping relation to each other, a saddle bearing near the inner end of each frame member and supporting the inner end of the other frame member so as to constitute a longitudinally slidable collapsible beam which is relatively rigid against downward deflection and is spaced above the bed, a pivot pin connecting each rocker arm to its adjacent frame member and positioned spaced above the bed, a brake beam carrying a brake shoe and positioned at each side of each rail, means at each side of each rail on each said frame member supporting the brake beams, the beams at the outer sides of the rails being slidable on their frame supports, rocker bearings operatively connecting each rocker arm with the adjacent brake beam at the outer side of the rail, means associated with each rail to wholly support the weight carried by a car wheel, means for simultaneously moving each main bearing nearer to or further from its adjacent pivot pin, elastic means positioned to react between the bed and each of the frame members for supporting the dead weight of the entire retarder structure from the bed, and cam means, operative to lower the entire retarder structure relatively to the rails and against the bias of said elastic means for thus permitting vehicles to pass over the rail free of, and above, the retarder.

19. In a car retarder of the two rail, track brake type, for use with a stretch of single track supported on a bed, a main support for each rail spaced from, and to the outer side of, each rail, a rocker arm for each rail and each carried by a said support and extending toward its rail, a frame member for each rail extending from the outer side of its rail, inwardly of its rail toward the other rail, so as to position their inner ends in overlapping relation, a saddle bearing near the inner end of each frame member supporting the inner end of the other frame member so as to constitute a longitudinally slidable compressible beam, substantially rigid against downward deflection, and spaced above the bed, a pivot pin connecting each rocker arm to its adjacent frame member and positioned spaced above the bed, a brake beam and brake shoe at each side of each rail, means at each side of each rail on each said frame member for supporting the brake beams, the beams at the outer sides of the rails being slidable, toward, and away from, the rails, on their frame supports, rocker bearings operatively connecting each rocker arm with the adjacent brake beam at the outer side of the rail, means on one of the shoes associated with each rail for supporting the weight on a car wheel, clear of the bed, said main supports each being constituted by a roller, an axle carrying each roller, a pair of wheels on each axle, a horizontal track crossway of the track rails for the wheels, a drive shaft, a closed drive loop driven by the shaft and passing around the shaft and each of the axles and connected to each shaft, for moving the rollers relatively to their adjacent pivot pins, a cam runway for each frame member, pivoted on the bed at one end and connected to its frame member at the other end, means restraining said wheels to horizontal travel, each roller, when moved inwardly beyond its pivot pin, forcing its adjacent runway downwardly to thus lower the entire retarder structure relatively to the rails, to permit vehicles of small clearances to pass over the rails.

20. In a car retarder of the track brake type for use with the two track rails of a stretch of single track supported on a bed, a main support for each rail spaced from, and at the outer side of, each rail, a rocker arm for each rail and each carried by a said main support at one end and having its other end extending toward its rail, a frame member for each rail extending from the outer side of its rail inwardly of its rail toward the other rail so as to position their inner ends in overlapping relation, a saddle bearing near the inner end of each frame member supporting the inner end of the other frame member so as to constitute a longitudinally slidable collapsible beam which is relatively rigid against downward deflection and positioned above the bed, a pivot pin connecting each rocker arm to its adjacent frame member and positioned spaced above the bed, a brake beam carrying a brake shoe and positioned at each side of each rail, means at each side of each rail on each frame member supporting the brake beams, the beams at the outer sides of the rails being slidable on their frame supports, rocker bearings operatively connecting each rocker arm with the adjacent brake beam at the outer side of the rail, means on one shoe for each rail to support a car wheel carried weight clear of the bed, means for simultaneously moving each main support nearer to or further from the adjacent pivot pin, and resilient support means for each frame member, comprising, a spring, a bell crank lever, means pivoting the lever to the bed, means connecting the spring to the lever to rock one of its arms upwardly, and means fixed on the frame member and receiving the upward thrust of the lever arm, whereby to resiliently support the entire retarder structure spaced from the bed.

21. In a car retarder of the track brake type, for cooperation with a track rail, a first support at one side of a track rail, an opposite movable support at the other side of the track rail, a rocker arm supported at one end on the movable support and extending toward the track rail, a brake shoe operatively connected to the rocker arm and positioned above and adjacent one side of the track rail, a beam supported at one end by the first support and extending toward the track rail, a brake shoe carried by the beam and positioned above and adjacent the other side of the track rail and spaced from the other brake shoe, shelf means on one of the brake shoes for supporting a car wheel clear of the track rail, and a pivot pin interconnecting the rail ends of the arm and beam and positioned so that the entire retarder structure is supported solely by said two supports when a car wheel is in the retarder.

22. In a car retarder of the track brake type, for cooperation with a track rail, a first support at one side of a rail, an opposite movable support at the other side of the rail, a rocker arm resting at one end on the movable support and extending toward the rail, a brake shoe operatively connected to the rocker arm and positioned adjacent and above one side of the rail, a beam carried at one end by the first support and extending toward the rail, a brake shoe constituted by a track rail and carried by the beam adjacent and above the other side of the rail, and spaced horizontally from the other shoe, shelf means on one of the brake shoes for supporting a car wheel clear of the rail, a pivot pin interconnecting the rail ends of the arm and beam and positioned so that the entire retarder structure is supported solely by said two supports when a car wheel is in the retarder, and adjusting means to move said movable support toward, and away from, the said pivot pin.

23. In a car retarder of the track brake type, for cooperation with a track rail, a first support at one side of a track rail, an opposite movable support at the other side of the track rail, a rocker arm supported at one end on the movable support and extending toward the track rail, a brake shoe operatively connected to the rocker arm and positioned above and adjacent one side of the track rail, a beam supported at one end by the first support and extending toward the track rail, a brake shoe carried by the beam and positioned above and adjacent the other side of the track rail and spaced from the other brake shoe, shelf means on one of the brake shoes for supporting a car wheel clear of the track rail, a pivot pin interconnecting the rail ends of the arm and beam and positioned so that the entire retarder structure is supported solely by said two supports when a car wheel is in the retarder, and adjusting means for varying the spacing of the shoes for compensating for brake shoe wear.

NED C. L. BROWN.